Jan. 31, 1956 A. BRUEDER 2,732,725
ELECTRO-MAGNETIC CHANGE-SPEED GEAR
Filed Oct. 2, 1952 2 Sheets-Sheet 1

Inventor
Antoine Brueder
By Robert E. Burns
Attorney

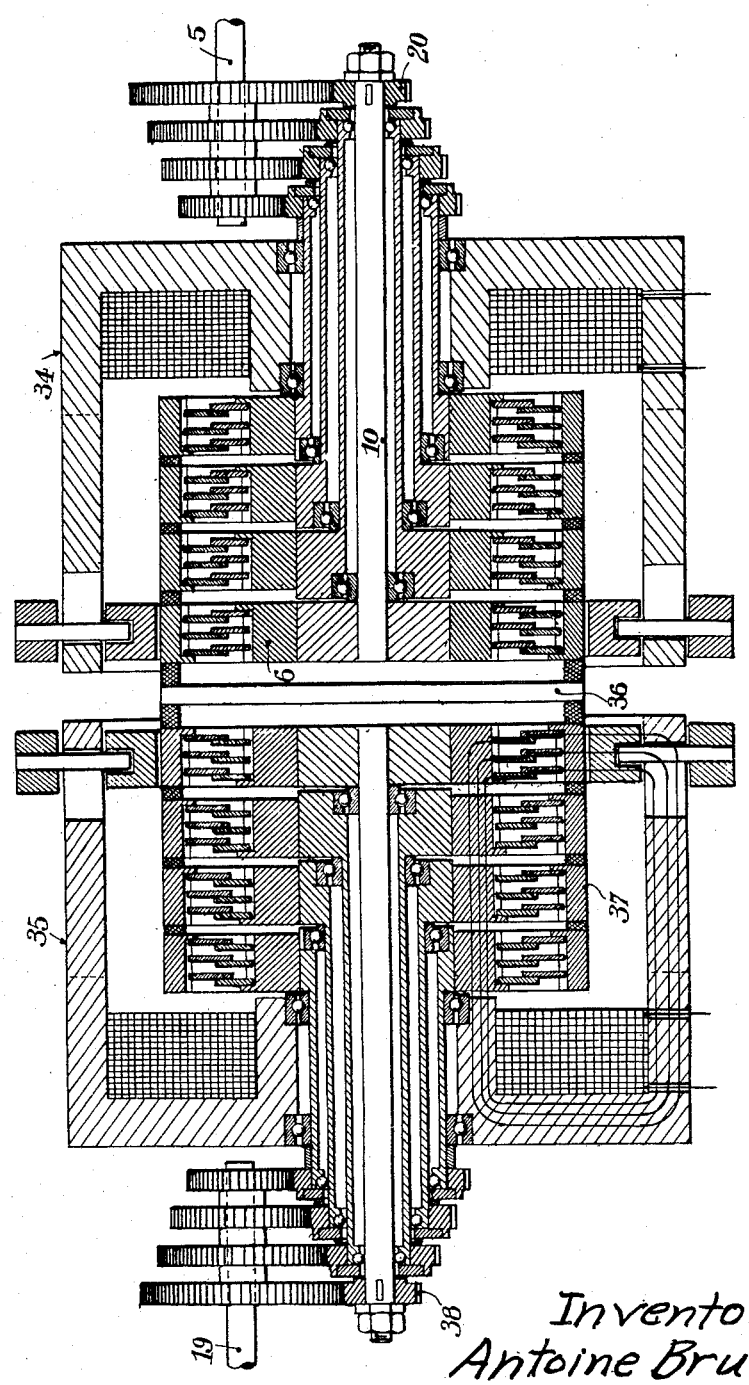

United States Patent Office 2,732,725
Patented Jan. 31, 1956

2,732,725
ELECTRO-MAGNETIC CHANGE-SPEED GEAR

Antoine Brueder, Paris, France, assignor to Societe Anonyme Andre Citroen, Paris, France Application October 2, 1952, Serial No. 312,720

Claims priority, application France October 5, 1951

3 Claims. (Cl. 74—330)

This invention relates in general to change-speed gears and more particularly to an electromagnetic change-speed gear or transmission consisting broadly of a plurality of elemental so-called multidisk clutches each comprising two sets of parallel disks formed with peripheral slots or notches, one set being mounted for axial sliding motion on, and rotation integrally with ribs extending from, the inner face of an outer ring member carried by an engine-driven or input plate common to all the clutches, the other set of disks being similarly mounted in alternate relationship with the former set on the outer face of an inner ring member concentrical with said outer ring member, the arrangement being such that each series of disks is associated with an independent inner ring member, the transmission also comprising a substantially annular, U-sectioned stationary magnet yoke surrounding the multidisk clutch assembly, the major portion of the inner leg of the U consisting essentially of the assembly of inner ring members, and the yoke receiving in its bottom portion the electromagnet coil.

One specific feature of the transmission arrangement according to this invention is that between the outer portion of the magnet yoke and the outer ring member there is mounted for axial sliding motion relative to the yoke a magnetic metal slide ring whereby the magnetic circuit can be completed therethrough and also through the sets of clutch disks which are in coplanar relationship with this slide ring.

Concentrical sleeve members, adequately mounted through the medium of ball or roller bearings support at one end and are rotatably rigid with a corresponding disk-carrying inner ring member; at the other end each sleeve member carries a gear of different diameter; a corresponding number of gears also of different diameters are keyed on the driven or output shaft of the transmission and held in meshing engagement with the sleeve gears. Thus, the arrangement will comprise as many pairs of constant mesh gears as there are disk clutches.

Through axial shifting of the magnetic metal slide ring in the yoke gap any selected one amongst the elemental clutches provided in the assembly may be engaged so as to drive the output shaft with the ratio provided by the particular pair of constant-mesh gear which is associated with the clutch engaged, the other clutches remaining disengaged or rotating freely.

The affixed drawings forming part of this specification illustrate diagrammatically by way of example two forms of embodiment of a transmission according to the invention. In the drawings:

Figure 4 is a sectional view similar to Fig. 1 showing a 16-speed transmission.

Figure 1:
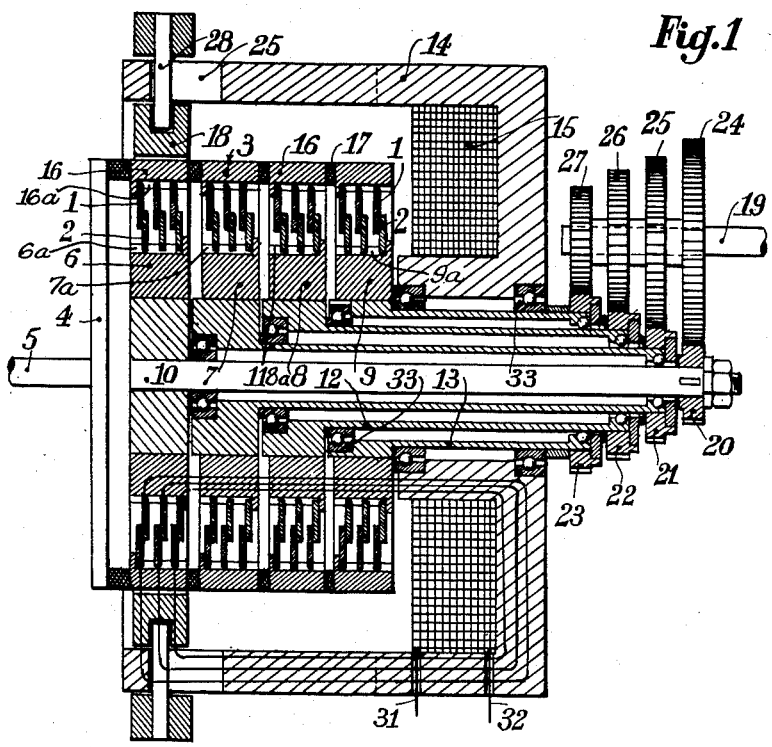
Figure 1 is a longitudinal horizontal axial section showing a four-speed transmission.

Referring first to the four-speed transmission illustrated in Fig. 1 it will be seen that it comprises a plurality of elemental disk clutches of the general type described and illustrated in the U. S. Patent No. 2,512,065 and U. S. application Ser. No. 39,777, filed July 20, 1948, now Patent 2,620,900. Each clutch consists of two sets 1, 2 of parallel slotted disks mounted for axial sliding movement in alternate relationship on ribs 16a formed on the inner face of an outer ring member 3 rigid with a drive plate 4 keyed or made otherwise fast with the input or engine shaft 5, and on ribs 6a, 7a, 8a, 9a projecting from the outer face of the relevant one amongst separate inner metal ring members 6, 7, 8, 9 arranged concentrically to the outer ring member 3 and secured to one end of corresponding hollow sleeves 10, 11, 12, 13; surrounding the parts so far described is a substantially annular stationary magnet yoke 14 having a U-shaped radial section; in the bottom portion of the U an electromagnet coil 15 is mounted; the major portion of the annular inner leg of the U consists of the aforesaid inner metal ring members 6 to 9. The outer ring member 3 consists of magnetic metal elements 16 alternating with non-magnetic metal elements 17 acting as insulating ring spacers. In the gap provided between this ring member 3 and the outer portion of yoke 14 an axially movable or slide ring 18 of magnetic metal is mounted as shown. Ultimately, the free ends of sleeves 10 to 13 are respectively fast with gears 20, 21, 22, 23 in constant meshing engagement with gears 24, 25, 26, 27 keyed on a common output shaft 19 from which the driving torque is transmitted. Preferably, gears 20 to 23 have progressively increasing or staggered diameters and gears 24 to 27 have progressively decreasing diameters.

The operation of the gearbox according to the invention is effected by rotatably connecting the input or engine shaft 5 with the driven or output shaft 19 through any one of the intermediate disk clutches 1, 2 wherein the disks engage each other by pairs; for this purpose, slide ring 18 is axially shifted in the gap provided between the outer portion of yoke 14 and the outer ring member 3. For example, when the slide ring 18 registers or is coplanar with ring member 6 (as illustrated in Fig. 1), a magnetic circuit is set up as follows: outer portion of yoke 14, slide ring 18, leftmost outer ring member 16, disks 1, 2 of the leftmost clutch, inner ring member 6, ring members 7, 8, 9, and back to yoke 14, thereby engaging clutch 16, 1, 2, 6 while the other clutches rotate freely in relation to one another. As a result, the relevant sleeve or shaft 10 will be driven at the same velocity of rotation as ring member 3 (or shaft 5) and at the opposite end the output shaft 19 will be driven with the ratio provided by the pair of constant mesh gears 20, 24. By adequately shifting the slide ring 18 the selected clutch is rendered operative and the rotary motion from shaft 5 is transmitted to output shaft 19 with the corresponding, selected reducing or step-up ratio.

Figure 2:
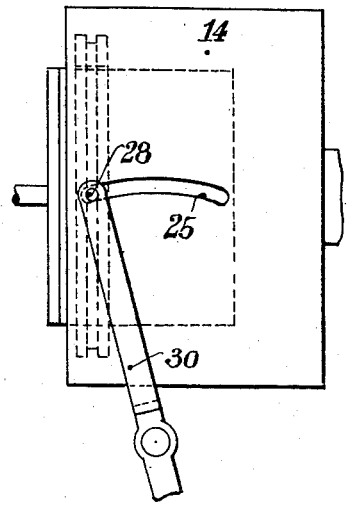
Figures 2 and 3 are a side view and an end view respectively showing a detail.
Figure 3:
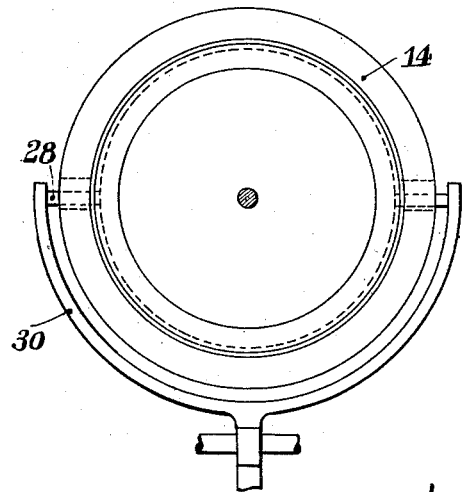

The shifting of this slide ring 18 may be controlled manually for example by means of a drive pin 28 (Figs. 2, 3) engaging the slide ring and passing through a convenient slot 25 provided in the yoke 14, this pin being rigid with a pivotally mounted selector lever 30 or any other adequate control device. Automatic shifting means may be resorted to without departing from the spirit and scope of the invention.

The drive plate 4 may act as a flywheel or be a component part of an alternator designed to supply electric energy to the electromagnet terminals 31, 32 and/or for ignition, lighting or other purposes according to the specific application for which the transmission is intended.

When changing speed the current for energizing the electromagnet coil 15 may be cut or not, the transmission being supplied with current from the aforesaid alternator.

Thus, a mechanically or semi-mechanically controlled electromagnetic transmission is obtained without any slip-ring, rotary or like contacts. It is not necessary to disengage the clutch or clutches when changing speed, as all the sleeve members 10, 11, 12 and 13 are constantly rotating on one another, with the interposition of bearings such as 33 for example, so that it is only by shifting the slide ring 18 and cutting if desired the current controlled by this shifting that the selected sleeve will transmit the torque to the relevant gears.

With this invention it is possible to obtain a large number of intermediate ratios or speeds, by either using a transmission having *n* elemental clutches, or combining two or more operatively connected transmissions of this type.

Fig. 4 illustrates diagrammatically a typical example of a transmission consisting of a pair of four-speed gears 34, 35 of the type shown in Fig. 1 and coupled together in face-to-face relationship. The input or engine torque is transmitted from shaft 5 to shaft 19 through gears 20, 21 . . . , sleeves 10, 11 . . . inner ring members 6, 7 . . . to outer ring member 3, across plate or coupling 36 to outer ring member 37 and thence through members disposed symmetrically in relation to the aforesaid ring members, sleeves and gears. Of course, the ratios provided on the one hand by the gears keyed on shaft 5 with those fast with sleeves 10 to 13 (i. e. gears 20, 21 . . . ) differ from the ratios afforded on the other hand by the gears keyed on shaft 19 with gears 38 . . . of the sleeve members of transmission 35, as will be readily understood by anybody conversant with the art.

With this arrangement, assuming that *n* elemental clutches are provided, the number of ratios obtained will be $(n/2^2)$ instead of *n*. If $n=6$ there will be nine ratios and if $n=8$ there will be sixteen ratios.

By positioning the control ring 18 intermediate two adjacent clutches a breaking action will result, the gearbox acting as a retarder or transmission brake.

In the arrangement shown in Fig. 4 the engine flywheel (not shown) is mounted on shaft 5.

With this specific arrangement it is possible to multiply the speeds in the transmission, thus reducing the overall dimensions thereof as the conventional speed reduction is obtained at the output and through the pairs of constant mesh gears.

What I claim is:

1. An electromagnetic transmission comprising a rotary driving member, an outer ring member of magnetic material coaxial with and rotatably fast with said driving member, a plurality of concentric hollow sleeves disposed one inside another coaxial with said driving member, inner ring members of magnetic material each fast respectively with one of said sleeves, a corresponding number of coaxial multiple disc clutches disposed between said outer and inner ring members, each of said clutches comprising two sets of interleaved parallel discs, the discs of one set being mounted inside said outer ring member for axial movement thereon and rotation therewith and the discs of the other set alternating with those of the first set and being mounted on the respective inner ring member for axial movement thereon and rotation therewith, a substantially annular stationary magnetic yoke which is U-shaped in axial section and comprising an outer annular portion surrounding and spaced from said outer ring member, an inner annular portion disposed coaxially with said inner ring members and a radial portion connecting said inner and outer annular portions, an electromagnetic coil mounted in said yoke between said inner and outer portions, a selector ring of magnetic material and movable axially in the space between the outer ring member and the outer annular portion of said yoke to selected positions in each of which it completes a magnetic circuit through one or another of said inner rings and thereby produces the engagement of the clutch associated therewith, a concentric gear rotatably fast with each of said hollow sleeves, said gears being of different sizes, a driven rotary member and gears rotatably fast on said driven member and in constant meshing engagement with corresponding ones of the first mentioned gears.

2. A transmission according to claim 1, in which said outer ring member comprises a plurality of axially aligned sections of magnetic material separated by non-magnetic material, said individual sections surrounding and thus corresponding to individual ones of said inner ring members.

3. In an electromagnetic transmission, a plurality of concentric sleeves disposed one inside another, a plurality of coaxial inner ring members of magnetic material each fast respectively with one of said sleeves, an outer ring member of magnetic material coaxially surrounding said inner ring members, a multiple disc clutch between each of said inner ring members and said outer ring member, each of said clutches comprising two sets of interleaved annular magnetic discs, the discs of one set being mounted inside said outer ring member for axial movement thereon and rotation therewith and the discs of the other set alternating with those of the first set and being mounted on the respective inner ring member for axial movement thereon and rotation therewith, a substantially annular stationary magnetic yoke which is U-shaped in axial section and comprises an outer annular portion surrounding and spaced from said outer ring member, an inner annular portion disposed coaxially with said inner ring members and a radial portion connecting said inner and outer annular portions, an electromagnetic coil mounted in said yoke, a selector ring of magnetic material movable axially in the space between the outer ring member and the outer annular portion of said yoke to selected positions in each of which it completes a magnetic circuit through one or another of said inner rings and thereby produces engagement of the clutch associated therewith, a rotation-transmitting member, and constant driving connections between said rotation transmitting member and each of said sleeves, said driving connections providing different speed ratios between said respective sleeves and said motion-transmitting member.

References Cited in the file of this patent

UNITED STATES PATENTS

| | | |
|---|---|---|
| 1,826,929 | Furnas | Oct. 13, 1931 |
| 2,067,685 | Schaper | Jan. 12, 1937 |
| 2,512,065 | Du Rostu | June 20, 1950 |
| 2,524,342 | Descendre | Oct. 3, 1950 |
| 2,549,896 | Dunham | Apr. 24, 1951 |
| 2,683,995 | Leiker | July 20, 1954 |

FOREIGN PATENTS

| | | |
|---|---|---|
| 559,774 | France | Sept. 21, 1923 |